Patented June 12, 1945

2,378,057

UNITED STATES PATENT OFFICE 2,378,057

TREATMENT OF HYDROCARBONS

Willis A. Yarnall, Beacon, N. Y., assignor, by mesne assignments, to The Texas Company, New York, N. Y., a corporation of Delaware No Drawing. Application March 18, 1939,
Serial No. 262,784

6 Claims. (Cl. 196—52)

This invention relates to the catalytic dehydrogenation and cyclization of hydrocarbons.

More particularly, the invention has to do with the dehydrogenation of normally gaseous hydrocarbons, and the dehydrogenation and cyclization of normally liquid hydrocarbons in the presence of a special catalyst under conditions of operation such that olefins or olefins and aromatic hydrocarbons are formed depending upon the hydrocarbons charged.

In the treatment of normally gaseous hydrocarbons, in accordance with the invention, hydrocarbons of two to four carbon atoms, and preferably those of three and four carbon atoms, such as propane and butanes, may be treated. By splitting off two hydrogen atoms, these hydrocarbons may be converted into olefins.

The normally liquid hydrocarbons contemplated for treatment may be gasoline or naphtha hydrocarbons and preferably hydrocarbons of five to twelve carbon atoms. Such hydrocarbons of straight chain character, by splitting off hydrogen, may be converted into olefins. Saturated cyclic hydrocarbons, such as naphthenes, may also be converted into cyclic olefins or aromatics by splitting off hydrogen. Also straight chain hydrocarbons of six to twelve carbon atoms may be dehydrogenated and cyclized into aromatic hydrocarbons, such as benzene or homologs thereof. Mixtures of hydrocarbons, such as gasoline or naphtha or relatively pure hydrocarbons, such as $C_5$, $C_6$, $C_7$ or $C_8$ compounds, may be treated to produce products of improved antiknock value for use in the manufacture of gasoline.

The catalysts which are used for the above purposes are specially prepared products obtained by treating natural or artificial zeolites such as Permutite or Doucil. The zeolites are hydrous silicates comprising about equal molecular proportions of an alkali metal oxide and aluminum oxide with varying proportions of silica and water. The alkali metal is replaceable by other metals and advantage is taken of this characteristic in the preparation of the present catalyst. It is preferable to use a highly absorptive material which may be obtained artificially or by acid treatment of natural or artificially prepared zeolites. The ratio of alkali to aluminum in such products may be about 1:1 or less. The alkali in these materials is replaced by a metal of the fourth, fifth and sixth group of the periodic system and preferably a metal selected from the group consisting of the metals of the left hand columns of groups IV, V and VI of the periodic table. Particular metals contemplated are titanium, zirconium, hafnium, thorium, vanadium, columbium, tantalum, chromium, molybdenum, tungsten and uranium. If desired, two or more of the above metals may be used.

In the preparation of the catalyst, the zeolite is digested, for example, by boiling with about 10% of a soluble salt of the desired metal such as the sulfate, nitrate or chloride, in a dilute water solution. The water solution is then drained off and the catalyst washed free of soluble salts with water. The zeolite in granular form is dried at about 500° C. before use. The product may be used in granular form or be pelletted into pellets of about 4 to 10 mesh.

The catalyst may be used in any well known or preferred type of apparatus, such as a tube and chamber, or in heated tubular type of equipment, comprising two or more tubes or chambers connected in series or parallel. The oil is preheated and passed in the vapor phase through the catalyst and the treated vapors separated in the conventional manner. The catalyst in time may deteriorate in efficiency due to carbon deposits and it is advantageous to intermittently regenerate the catalyst by burning off the carbon. The regeneration may take place without interrupting the operation by using multiple catalyst chambers and cutting out the chamber for regeneration while others are in use.

When using the above catalyst for the purpose described, elevated temperatures of about 400° to 600° C. are required although temperatures up to 700° C. may be used. Ordinarily temperatures of about 450° to 575° C. are suitable. At these temperatures a time of reaction of between about 10 to 50 seconds and preferably around 20 seconds is suitable.

In some cases it is advantageous to use a substantial pressure of hydrogen for the purpose of increasing the life of a catalyst, preventing carbon formation, and suppressing side reactions, such as cracking. It is contemplated, therefore, that when treating the normally liquid hydrocarbons particularly a substantial hydrogen pressure may be used by either introducing extraneous hydrogen or by separating the gases produced in the operation and recycling them with the charge through the reaction zone. The hydrogen pressure may vary somewhat with the type of hydrocarbon treated, but ordinarily hydrogen pressures of about 4 to 10 atmospheres are satisfactory.

As an example of the invention, normal heptane is contacted at a temperature of around 575° C., at substantially atmospheric pressure, and during a reaction time of about 20 seconds with a zeolite in which the alkali metal has been replaced by molybdenum. A high yield of toluene is obtained.

As a further example of the invention, a petroleum naphtha of about 10 octane number is contacted at substantially atmospheric pressure, at a temperature of about 550° C. and during a reaction time of about 20 seconds with a zeolite in which the alkali metal had been replaced with zirconium. A yield of about 90% of a product having an antiknock value of about 55 is obtained.

Obviously many modifications and variations of the invention, as hereinbefore set forth, may be made without departing from the spirit and scope thereof, and therefore only such limitations should be imposed as are indicated in the appended claims.

I claim:

1. A process for the dehydrogenation and cyclization of gasoline hydrocarbons which comprises passing the hydrocarbons at temperatures of about 450° to 575° C. over granules of a solid catalyst comprising a zeolite in which the alkala metals have been replaced by a metal selected from the group consisting of metals of the left hand column of group VI of the periodic system.

2. A process according to claim 1 in which the operation is carried out under a hydrogen pressure of about 4 to 10 atmospheres.

3. A process for the production of aromatic hydrocarbons from straight chain hydrocarbons of 6 to 12 carbon atoms which comprises subjecting the hydrocarbons in the vapor phase to the action of a zeolite catalyst at temperatures of about 400° to 600° C., said catalyst obtained by replacing the alkali metals of a zeolite with a metal selected from the group consisting of the metals of the left hand column of group VI of the periodic system.

4. A process for reforming gasoline hydrocarbons which comprises passing the hydrocarbons in vapor phase at temperatures of about 400 to 700° C. over a zeolite catalyst in which alkali metal of the zeolite has been replaced by a metal selected from the group consisting of metals of the left-hand column of group VI of the periodic system.

5. A process for reforming gasoline hydrocarbons which comprises passing the hydrocarbons together with a substantial amount of hydrogen in vapor phase at temperatures of about 400 to 700° C. over a zeolite catalyst in which alkali metal of the zeolite has been replaced by a metal selected from the group consisting of metals of the left-hand column of group VI of the periodic system.

6. A process according to claim 5 in which the hydrogen is provided by recycling hydrogen-containing gases produced in the operation.

WILLIS A. YARNALL.